United States Patent [19]
Cerroni

[11] 3,952,113
[45] Apr. 20, 1976

[54] SYSTEM FOR RECOVERING AND TREATING STOCKFEED FROM URBAN WASTE MATERIALS

[76] Inventor: Manlio Cerroni, Via Bruxelles 53, Rome, Italy

[22] Filed: Apr. 24, 1974

[21] Appl. No.: 463,767

Related U.S. Application Data
[62] Division of Ser. No. 358,516, May 9, 1973, Pat. No. 3,891,104.

[30] Foreign Application Priority Data
Feb. 22, 1973  Italy .................................. 48411/73
Apr. 20, 1973  Italy .................................. 49595/73

[52] U.S. Cl. ............................. 426/456; 134/10; 209/12; 426/416
[51] Int. Cl.² .................................................. A23K 1/00
[58] Field of Search ............. 134/10, 25 R; 209/18, 209/173, 12, 142, 144, 158, 159, 211, 13; 241/15, 20, 24, 25; 162/4; 426/416, 456

[56] References Cited
UNITED STATES PATENTS

| | | |
|---|---|---|
| 1,822,469 | 9/1931 | Weber .................................. 209/12 |
| 2,221,444 | 11/1940 | Dodge et al. ...................... 209/13 X |
| 2,471,326 | 5/1949 | Hoyt, Sr. ............................... 209/144 |
| 3,549,092 | 12/1970 | Baxter, Jr. ............................ 241/15 |
| 3,554,371 | 1/1971 | Leonard ........................... 209/158 X |
| 3,597,308 | 8/1971 | Brooks ............................. 209/173 X |
| 3,736,223 | 5/1973 | Marsh ................................ 241/15 X |
| 3,817,458 | 6/1974 | Gilberto ................................ 241/20 |

Primary Examiner—S. Leon Bashore
Assistant Examiner—Richard V. Fisher
Attorney, Agent, or Firm—Toren, McGeady and Stanger

[57] ABSTRACT

In handling solid urban wastes collected in plastic and/or paper bags, the bags are lacerated for exposing the waste material within them. The materials are processed to recover paper-pulp and stockfeed. In processing the material to recover stockfeed, the material is washed and separated into heavy inert components and light inert components and edible components. These lighter components are dried, loosened and passed through cyclone separators and screened to separate the edible components from the light inert components.

4 Claims, 13 Drawing Figures

Fig. 13

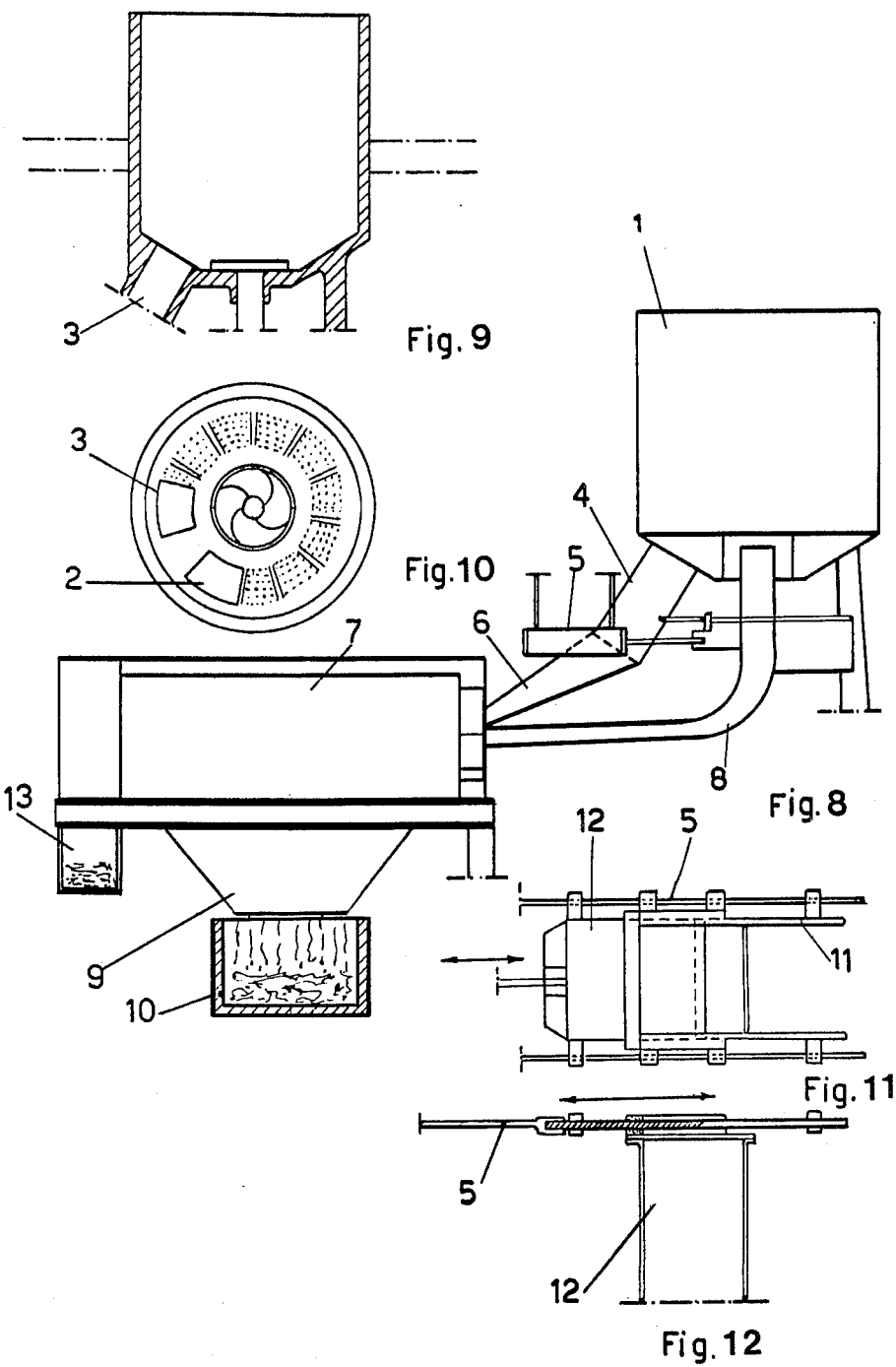

SYSTEM FOR RECOVERING AND TREATING STOCKFEED FROM URBAN WASTE MATERIALS

This is a division of application Ser. No. 358,516, filed May 9, 1973, now U.S. Pat. No. 3,891,104, issued June 24, 1975.

It is well-known that it is possible to find various materials in solid urban wastes which, if suitably recovered and processed, will be of interesting commercial value. Therefore, for example, it is important to recover waste paper and to process it into paper-pulp or to process products which are suitable for use as stockfeed, or stockfeed-supports or other products.

It is also known in plants for recovering useful products from solid urban wastes that it is necessary to dispose of loose material which can be subsequently processed to separate different components.

Furthermore, it is general practice to collect waste material in non-return bags or bags formed from a combination of paper and plastic sheets.

Therefore, from the foregoing, it can be appreciated that there is a need for opening or preferably breaking open the bags in a reliable and speedy manner so that loose material can be supplied into the recovery plant ready for processing.

Over the years, it has been observed that in solid urban wastes more and more materials are present which cannot be classified as paper and which at the same time are waterproof.

In other words, the materials which cannot be classified as paper but which is waterproof originates from the waste plastic materials used for various kinds of packaging. Such waste plastic materials cannot be used for producing paper-pulp and is a hindrance in the mechanical sorting of waste materials. Therefore, up until the present, the separation of paper and plastic materials had to be done manually and, of course, such manual labor considerably increases the processing costs and, furthermore, is not acceptable from a hygienic point of view.

It is also known that solid urban wastes contain an appreciable quantity of paper which could not be recovered in a convenient manner because of its incomplete separation from foreign material. In some instances the paper is combined with the foreign material in a very tenacious way and the foreign bodies may have a specific weight greater than, equal to, or smaller than that of paper. In hydrodynamic kneaders which are usually used, the paper from solid urban wastes is fed to the kneaders only after a manual sorting operation and a considerable amount of labor working under very bad conditions from a hygienic point of view, is involved. Futhermore, this manual sorting operation allows for a recovery of only a portion of all the paper which is present in the solid urban wastes.

In the course of improving the recovery of materials from solid urban wastes, mechanical sorting of paper has been successful using special equipment, however, this equipment fed not only paper to the kneaders but also foreign materials having a specific weight greater than, equal to, or smaller than that of the paper. Of course, such materials are a hindrance in the operation of hydrodynamic kneaders which discharge a poor quality of paper pulp and, at the same time, such materials cause entanglements in the kneaders, usually called plaits, of non-pulp-reducible materials. The presence of these last mentioned products compels the frequent stopping and emptying of the kneaders for removing such products and, as a result, involves a sizable reduction in the output of the plant and, in some extreme cases, also causes a stopping or shutdown of the plant.

In addition, it is also known that in feeding animals on farms, many kinds of stockfeeds are used and many of these stockfeeds are obtained from products removed from many different sources and one of these sources is urban wastes.

It is also well-known that urban wastes, due to their sources, contain a certain amount of products not convenient or suitable for use as stockfeeds. However, these unsuitable products were not positively separated to the desired extent from the basic product to be used for producing stockfeeds. These unsuitable materials may have a specific weight greater than, equal to, or less than the specific weight of the products for use as foodstuffs in stockfeed. Therefore, an object of the present invention is to provide a process for tearing plastic bags or paper bags containing any kind of material and, more particularly, solid urban wastes and also includes a device for implementing the process.

According to the process, it is the object of the invention to attack the bags using a mechanical device comprising many levers having an alternating movement, which movement vaguely reproduces the movement of scissors having spaced and not adherent blades. Such movement causes continuous lacerations (tears and not cuts) in the bags so that the materials they contain are exposed. The mechanical device used for carrying out the aforementioned process comprises a series of spikes hinged on a fixed axis and provided with a periodic lifting and lowering movement of the free ends of the spikes and also includes a series of knives which are articulated in a particular direction and are fixed to an axis having a rotating motion in the two directions of an arc of about 90°. These two movements are in perfect synchronism being operated only by a device, and preferably by a alternatively driven piston, which may be hydraulic or pneumatic and which has a pressure limiting device (pressure switch) which intervenes each time the knives meet an excessive resistance for automatically reversing the rotative movement.

The connection between the movement of the knives which are operated directly from the piston and of the spikes is obtained through a constraint element such as a rope or chain which allows the spikes, which hook the bags to be stopped in their downward travel at a height derived by the compactness and nature of the materials within the bags. Further, the constraint element acts in such a way that when the traveling knife skims the feeding band and meets with a spike in its lowered position, the knife and spike act as a scissors.

Both the spikes and the knives travel at an adjustable distance from the feeding band, with the distance being a function of the size of the bags and of the nature of the materials within and of the strength of the bags.

The rim speed at which the knives travel in their arc of operation is usually greater than or equal to the speed of travel of the feeding band for avoiding slowing down the speed of the bags on the feeding band. Furthermore, the arc of operation is adjustable in its angle and at the same time is also adjustable to the speed of its covering. Moreover, the knives are moved in a direction so that in their reverse movement they avoid entraining any of the materials contained in the bags.

Another object of the present invention is to provide a plant for the continuous production of paper-pulp from solid urban wastes in which the hindrances mentioned above are avoided. According to the present invention, the waste paper issuing from a sorting plant, i.e., the paper carrying with it materials having a specific weight different from that of the paper and in any case foreign materials, which are joined to or adhere to the paper, are fed to a known hydrodynamic kneader. Paper-pulp is withdrawn from the hydrodynamic kneader in a known system. Now, independently of the system for withdrawing paper pulp to be subsequently refined, there is provided downstream of the hydrodynamic kneader, a valve which is periodically opened and closed and through which both paper-pulp and other materials are withdrawn which are not susceptible to deterioration and mushing by the action of water.

Both the paper-pulp withdrawn from the plant in a continuous manner according to the normally employed system, and the material withdrawn through the above-mentioned valve, are fed, in accordance with the present invention, to a sorting apparatus which separates the paper-pulp rich in water from the other materials and more particularly from the materials not susceptible to being affected by the action of the water and which materials have a specific weight equal to or less than that of the paper. Such materials are removed from the plant on special conveyors. On the other hand, the pulp coming out of the plant of the present invention through the revolving apparatus, is collected in tanks or vats which act as plenum chambers for the following portion of the plant, that is, the portion provided for subsequent treatment of the paper-pulp obtained from the kneaders. This coarse paper-pulp must be subjected to a treatment for separation of foreign materials, such as metallic elements, stone, sand, and the like. Further, the plant also includes equipment for thickening the purified paper-pulp coming from the plant upstream of its location, to a value of water content which will allow the transportation of the paper-pulp to and its subsequent use in paper mills.

It is another object of the present invention to provide a process having a purpose of obtaining a base-product to be used as stockfeed. According to this process, the material issuing as a base product but still mixed with non-edible material, is subjected to a washing treatment and subsequently to sedimentation. Following the sedimentation the obtained product is subjected to a screening and then to a pressing operation.

The product obtained from these various operations, after sterilization, is subject to treatment in driers and in cyclones. Following these treatment steps, according to the present invention, the product issuing from the last cyclone, where the lighter inerts are separated and carried to the waste, the edible products are directed to a following treatment plant. It is to be observed specifically that the light inerts are separable with difficulty from the remaining edible material and the separation between the two products is made in a special sorting device to which only the edible products, previously reduced to powder, can pass. The light inerts, in consequence of the existing conditions of temperature and pressure, are not reduced to powder and, therefore, can be separated from the edible materials and removed from the processing cycle of the edible materials.

These and other objects of the present invention will appear more clearly from the following description to be considered in accordance with the drawings, in which:

FIG. 8 is a diagram of a plant in accordance with the present invention, used for the continuous production of paper-pulp;

FIGS. 9 and 10 show diagrammatically in vertical section and in top view, respectively, a hydrodynamic kneader, in accordance with the present invention;

FIGS. 11 and 12 illustrate in side view and plan view, respectively, a preferred type of valve employed in the plant according to the present invention.

Figure 1:
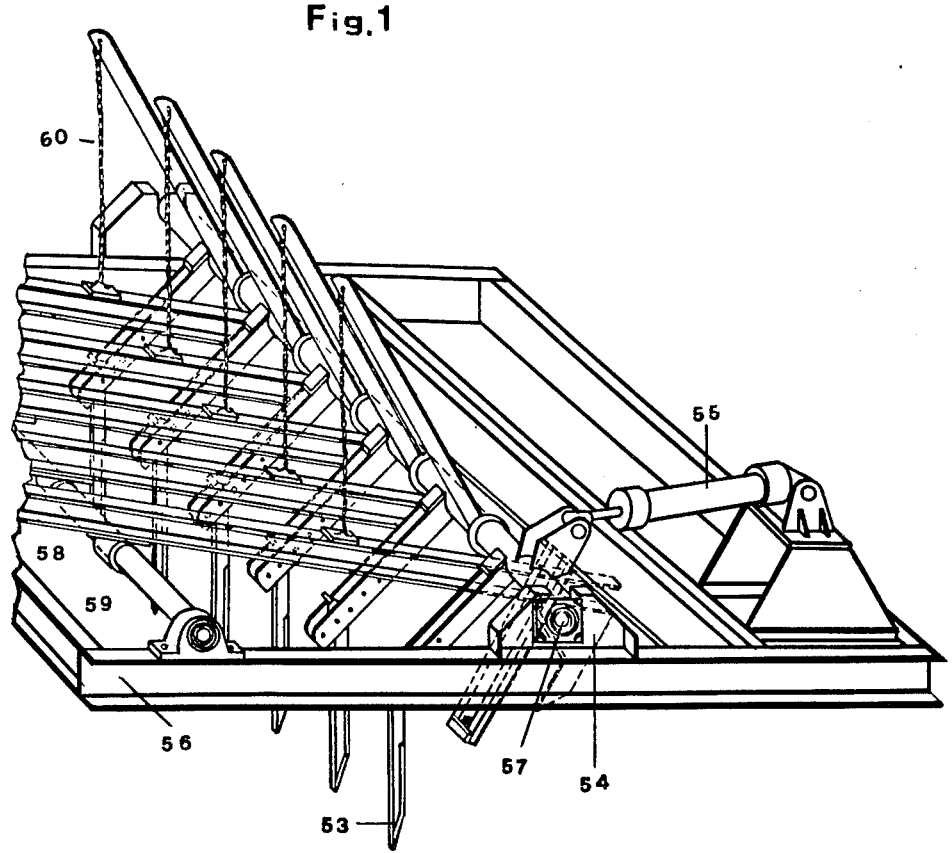
FIG. 1 shows a perspective view of a device for tearing bags in a preferred embodiment of the present invention.

As shown in the drawings and more particularly in FIGS. 1–7, the device for implementation of the present invention for tearing bags comprises a frame self-cleaning on which are mounted a piston 55 and a series of spikes 54 and knives 53. The knives 53 are attached to a shaft 57 which is carried by suitable cross-bars 58 hinged on an axis 59 acting as a pin. The spikes 54 are affixed to the cross-bars 58. As it is possible to observe in a better manner in the diagrammatic showings of FIGS. 2 to 7, the bags 51 filled with materials, travel along on a conveying band 52 until they encounter the device in its open position, note FIG. 2.

In this open position, the knife 53 and the spike 54 are in the upwardly lifted positions and the piston 55 is in its withdrawn or retracted position. In such a position, the bags are traveling forwardly on the conveying band without being disturbed. In the position illustrated in FIG. 3, the knife 53 starts to move downwardly as the piston 55 commences its extension from the retracted position, so that all of the unit is lowered as is also the spike with the consequence that the spike hooks the bag traveling under it, stopping the bag in this position.

Figure 3:
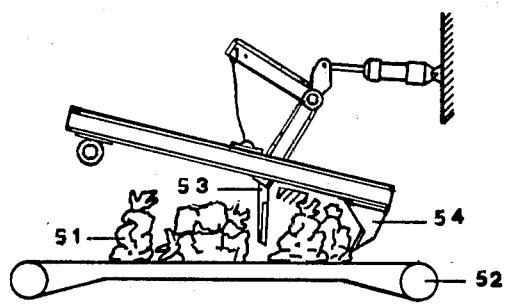
Figure 4:
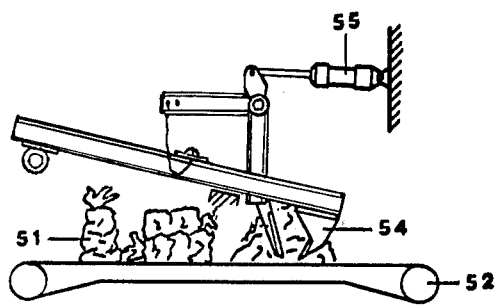

As a consequence of the extension of the piston, the unit continues its downard movement until it reaches the position shown in FIG. 4. In FIG. 4 the knife approaches the spike and commences the tearing action on the bag while the spike remains in a stationary position. As it is possible to observe in FIG. 4, the restraint device 60 between the cross-bar 58 carrying the spike 54 and the lever carrying the knife rotates as a consequence of the extension of the piston while the spike remains in the position it had already attained as shown in FIG. 3, this last position being its limiting one. As mentioned above, the knife 53 approaches the bag and commences the laceration or tearing of the bag, and the spike remains stationary in consequence of its own weight in the position it has reached.

Figure 5:
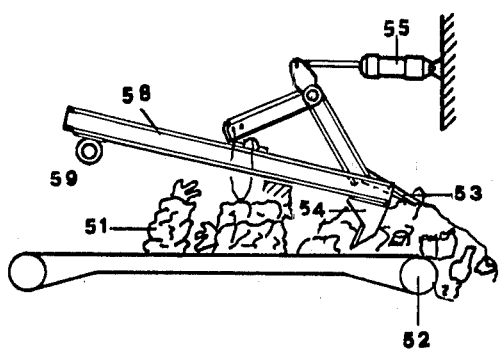

As a consequence of the extension of the piston 55, the knife 53 moves forwardly as can be viewed in FIG. 5 and completes its tearing action on the bag and the spike 54, which has been previously observed, presses with its own weight and can be lifted as a consequence of the action of the knife when a body which is particularly tough or an excess of material become wedged between the knife and the spike. This freedom of movement of the tearing device just mentioned, has the purpose of allowing a surer operation of the above-mentioned device.

Figure 2:
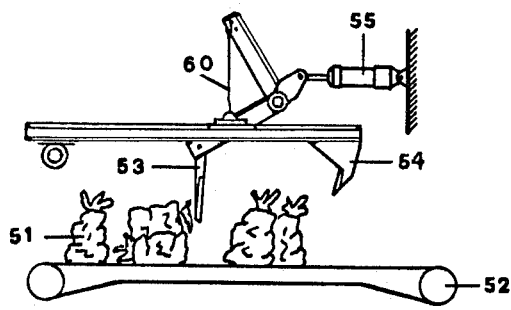
FIGS. 2 through 7 show diagrammatically the kinematic motion of the device in FIG. 1 in its different operating positions.
Figure 6:
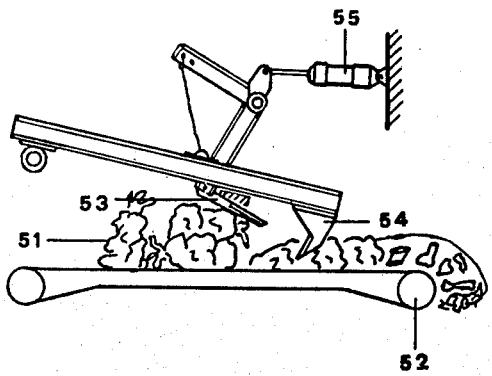
Figure 7:
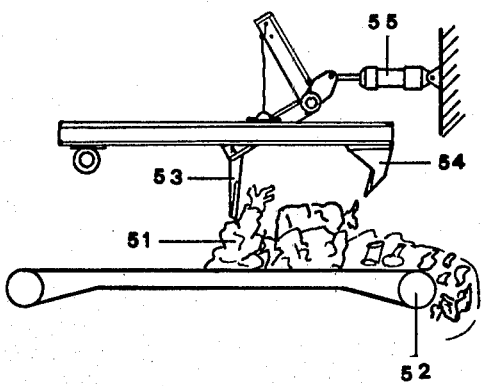

In the position of the device illustrated in FIG. 6, the knife 53 completes its reversal movement and due to its unidirectional articulation, the knife is self-cleaning and, therefore, avoids the possibility of carrying any of the material rearwardly during its reversal movement. In this position the spike 54 remains in its lowered position. As the piston 55 is retracted, the knife 53 returns to its original position as shown in FIG. 2. As a consequence of the traction exercised on its cross-bar 58 by the constraint device 60, the spike is lifted completing the cycle of operation. Of course, the cycle is repeated periodically and disposing of a convenient number of knives and spikes across the width of the feeder or conveying band 52. The tearing of the bags can be continuous or can be ended only when a passage would not be sufficient. It is possible to provide other equipment similar to the one described, always on the same feeder but with parameters (as wheel, action arc, distance, pressure, frequency, etc.) that are adjusted in a different way.

With the process illustrated in FIGS. 1–7, not only is it possible to perform an operation which until the present could not be achieved with other systems, but it also has the great merit of not maltreating the materials within the bags, since the bags are not removed on the feeder and, at the same time, are not subjected to a cutting operation.

As mentioned previously, and with reference to FIGS. 8–12, the recovered paper issuing from a feeder, is passed to a hydrodynamic kneader 1. The kneader 1 has a normal safety valve 2 and an additional opening 3. A pipeline 4 is connected to the opening 3 and contains a valve 5 at a convenient location. The valve can be controlled periodically. A pipeline fitting 6 extends from the valve 5 for feeding the material to a sorting apparatus 7. As can be seen in FIG. 8, another pipeline 8 extends from the kneader 4 withdrawing the pulp from the kneader in a continuous manner following well-known procedures for delivering the pulp into the apparatus 7. The apparatus 7, shown diagrammatically in FIG. 8, can be provided on its interior with a perforated skirt through which the paper-pulp rich in water passes. Subsequently this paper-pulp goes through a convenient hopper 9 into storage tanks and basins 10. Materials different from paper-pulp and having a size which does not permit them to pass through the perforated skirt, are carried to the outlet of the apparatus on a conveyor band 13, or by using any other kind of conveyor for passing such materials to another storage space, whether for subsequent treatment or for destruction.

As mentioned earlier, a pipeline 4–6 extends from the kneader 1 and contains a valve 5 located intermediate the kneader and the sorting apparatus 7. The valve 5, as represented generically in FIGS. 11 and 12, is preferably a guillottine-valve composed of a frame 11, within which a blade 12 travels controlled through a convenient system, preferably a hydraulic system. The blade 12 has its edge in the side opposed to the one from which it is controlled, shaped as a knife for producing a true cut of the material located between the blade 12 and the frame 11 at the moment at which the valve is closed. This arrangement is particularly important, since it allows a rear and exact closing of the valve and also allows the interception of the material which passes through the pipelines 4–6 and the valve 5 to reach the interior of the sorting apparatus 7. The removal through the pipeline 4–6 is such that the recovered paper, contained in the kneader 1, remains therein for a time sufficient to reach the desired maceration degree.

According to another feature of the plant, the water used in the treatment of the recovered paper, is suitably recovered and recycled in the kneader thereby allowing a sizable economy of water and affording an ecological safeguard which is very badly needed at the present time.

As previously stated and as is apparent to those skilled in the art, the present invention allows the attainment of a paper-pulp under any means quite in conformity with the requirements of paper mills and, at the same time, allows a quick continuous complete use of the paper which is present in solid urban wastes.

Figure 13:
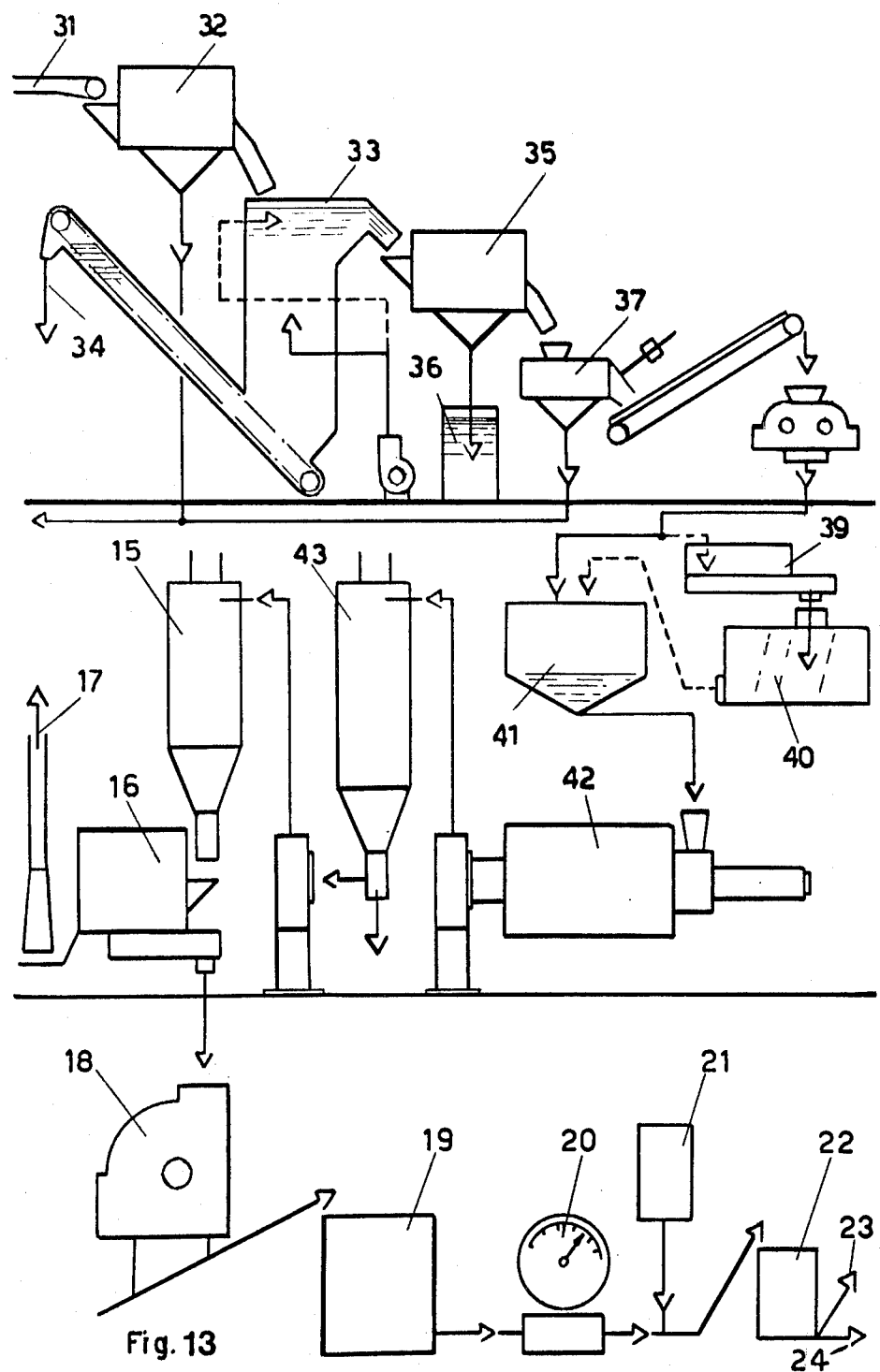
FIG. 13 displays a diagram of a plant for carrying out the process for the production of a base product to be used as stockfeed.

In FIG. 13 a schematic layout of a plant is shown for the production of a base product to be used as stockfeed. In the plant, the material to be processed, coming, for example, from the processing of solid urban wastes, is fed through conveying means 31 to a washing screen 32 where the product is subjected to a strong and effective washing for removing mold and small inert components. From the washing screen, the material is carried to a sedimentation basin, where heavy inert components, for example, glass, stone, iron scraps, and different wastes, fall to the bottom and are collected and discharged through an exhaust outlet 34. From the sedimentation basin 33, the light edible products are dragged from the water and are routed to a separation screen where the material having a specific weight only a little greater than that of water, are helped in their floating action from a tangential rising stream, the stream originating from the recovery water coming from the weir of the sedimentation basin 33.

The stream can act only in the direction of the fall of the material just under the water surface, in such a way as to carry components immediately to the weir which have a specific weight also just a little greater than that of water. From the weir of the basin 33, the water and the edible products fall into a screen 35 for the purpose of separating the water from the edible products. The drained water is collected in a basin 36 and is fed through a pump to the sedimentation basin. As can be noted in FIG. 13, the water coming from the pump is admitted into the sedimentation basin from its bottom and/or, as shown by the dashed lines, it is admitted tangentially just under the surface of the water in the basin.

The edible products pass from the screen 35 to a press 37 having a pressure which is adjustable for eliminating as much water as possible from the edible products.

Therefore, at the end of its treatment cycle, it is possible to obtain a product free of the greater part of its heavy components and also of a greater part of the washing water.

The products following the already known treatment line are directed into a plenum chamber 39 and then into an autoclave 40 and from the autoclave into a dosing plenum-chamber 41 and thence to a drier 42 where any remaining water is eliminated for completely drying the product and, at the same time, providing for its improvement and sterilization. At this particular stage, the edible product always carries some of the light components, therefore, the product obtained from the drier 42 is loosened and directed into the cycles 43 and 15 and then to the screen 16 for the purpose of separating the edible material from the light waste-components which are the last ones sucked through the exhaust outlet 17. In the meantime, the edible product is discharged into a mill 18 in which it is subjected to subsequent treatment.

One of the most important features of the present process involves subjecting the edible product to a first treatment in which the heavy waste products, not usable, are separated. The separation of the powder of the edible product from the light inert material which was not possible to be reduced to a powder, is obtained through another screen having very thin holes and preferably under pressure, so that it is possible to obtain a true and efficacious separation of the different components allowing the elimination of the light inerts from the edible product. As previously mentioned, at the exit from the screen 16, for the purpose of separating the inert components, the edible product is fed to a mill and from the mill to a silo 19 from which the edible product is passed through a scale 20 and an integrator 21 to a silo 22 for the stockfeed and from the final silo 22, the stockfeed passes to a pelletizing machine or to a bag-filling machine 24.

The improvements to the process and to the plant for the recovery and treatment of useful substances contained in solid urban wastes, have been described and illustrated only in a non-limiting example. It is to be understood that the invention is capable of other practical variations, as suggested from the technique and practical application disclosed without departing from the spirit and scope of the invention as set forth in the enclosed claims.

I claim:

1. Improvements in the process for the recovery of a base-product for stockfeed from solid urban waste material from which paper-pulp has been removed and which includes edible components, mold, light inert components, and heavy inert components, comprising the steps of washing the material for removing mold and at least some of the light inert components, conveying the remaining washed material into the upper end of a chamber containing water and directing water into the chamber for providing a rising stream of water for settling heavy inert components downwardly through the rising stream of water and floating light material including light inert components and edible components having a specific gravity in a range of up to only slightly greater than 1 to the surface of the water in the chamber, removing the floating light material from the chamber, draining water from the removed light material, pressing the light material for providing further removal of water, drying the light material, loosening the dried light material, exposing the loosened dried light material to cyclonic separation and screening the material which has been cyclonically separated for separating the edible components from the remaining light inert components, and collecting the edible components.

2. Improvements in the process for the recovery of a base-product for stockfeed, as set forth in claim 1, wherein the step of directing the water into the chamber comprises directing the water tangentially into the chamber just below the water level therein.

3. Improvements in the process for the recovery of a base-product for stockfeed, as set forth in claim 1, wherein the step of directing the water into the chamber comprises directing the water into the bottom of the chamber for movement upwardly therethrough.

4. Improvements in the process for the recovery of a base-product for stockfeed, as set forth in claim 1, comprising the further step of collecting the water drained from the light material and pumping the collected water into the settling chamber.

* * * * *